United States Patent
Calcagni

(10) Patent No.: US 11,940,002 B2
(45) Date of Patent: Mar. 26, 2024

(54) ADJUSTABLE POTTED INSERT

(71) Applicant: MILLECENTO DESIGNS INC., Kirkland (CA)

(72) Inventor: Mario Calcagni, Kirkland (CA)

(73) Assignee: Millecento Designs Inc., Kirkland (CA)

( * ) Notice: Subject to any disclaimer, the term of this patent is extended or adjusted under 35 U.S.C. 154(b) by 846 days.

(21) Appl. No.: 16/966,207

(22) PCT Filed: Jan. 30, 2019

(86) PCT No.: PCT/CA2019/050109
§ 371 (c)(1),
(2) Date: Jul. 30, 2020

(87) PCT Pub. No.: WO2019/148272
PCT Pub. Date: Aug. 8, 2019

(65) Prior Publication Data
US 2021/0040969 A1    Feb. 11, 2021

Related U.S. Application Data

(60) Provisional application No. 62/623,613, filed on Jan. 30, 2018.

(51) Int. Cl.
*F16B 5/01* (2006.01)
*F16B 37/04* (2006.01)
*F16B 37/12* (2006.01)

(52) U.S. Cl.
CPC .............. *F16B 5/01* (2013.01); *F16B 37/122* (2013.01); *F16B 37/042* (2013.01)

(58) Field of Classification Search
CPC ........ F16B 5/01; F16B 37/122; F16B 37/042; F16B 13/141; F16B 37/048
See application file for complete search history.

(56) References Cited

U.S. PATENT DOCUMENTS

| | | | |
|---|---|---|---|
| 3,468,358 A | 9/1969 | Neuschotz | |
| 3,646,981 A | 3/1972 | Barnes | |
| 3,771,272 A | 11/1973 | Mihaly | |
| 5,028,189 A | 7/1991 | Harley | |
| 8,689,409 B2 * | 4/2014 | Hanley | ............... E04F 13/0885 24/297 |
| 10,197,078 B2 * | 2/2019 | Richardson | ........... F16B 5/0208 |

(Continued)

FOREIGN PATENT DOCUMENTS

EP          682185 A1 * 11/1995 ............ F16B 37/042

*Primary Examiner* — Rodney Mintz
(74) *Attorney, Agent, or Firm* — Philip A. Swain; Equinox IP Inc.

(57) ABSTRACT

The present disclosure relates to a two-part adjustable potted insert to be received within an insert hole of a honeycomb panel for fastening a threaded fastener thereon. The insert comprises an outer structural member which is configured to be received within the insert hole, and an inner structural member in a releasable engagement with the outer structural member. The outer structural member comprises an external main body which defines an external surface configured to resist pull-out and torque-out to retain the outer structural member in the honeycomb panel when inserted in the insert hole, a threaded opening within the external main body which defines a bottom surface, and a locking recess formed within the bottom surface.

19 Claims, 11 Drawing Sheets

(56) References Cited

U.S. PATENT DOCUMENTS

| | | | | |
|---|---|---|---|---|
| 11,009,055 B2* | 5/2021 | Richardson | ........... | F16B 37/122 |
| 2011/0176863 A1* | 7/2011 | Hanley | ............... | E04F 13/0833 |
| | | | | 403/267 |
| 2017/0082125 A1* | 3/2017 | Richardson | ........... | F16B 5/0208 |
| 2019/0128298 A1* | 5/2019 | Richardson | ........... | F16B 37/122 |

* cited by examiner

ADJUSTABLE POTTED INSERT

CROSS-REFERENCE TO RELATED APPLICATIONS

This application claims priority from U.S. Provisional Patent Application No. 62/623,613 filed on Jan. 30, 2018.

TECHNICAL FIELD

The present disclosure relates to fastening systems. More particularly, the present disclosure relates to adjustable potted inserts to be received within honeycomb panels or similar composite panels for fastening threaded fasteners thereon, and to methods of using the same.

BACKGROUND

Potted inserts are used to provide attachment and fastening of components to composite honeycomb sandwich structures or honeycomb panels. Commonly referred to as "Delrons", they are widely used in the Commercial and Business Aircraft Industry for any purpose where assembly (or disassembly) of any two or more component assemblies is required. Potted inserts may be used in any situation where the fastening of an object to the surface of a Honeycomb Composite Panel is needed where no attachment point is present. Potted inserts are always intended to be installed flush with the panel's surface so that there are no protruding flanges.

Traditional potted inserts are fabricated as a single piece unit, which poses numerous disadvantages. For example, if the insert is damaged, or if the application requires a different sized fastener due to engineering change requirements, currently, the entire insert must be replaced, which may be difficult and time-consuming, causing significant rework costs and potential material replacement costs (including substantial labor costs to affect the repair) due to damages performed to the composite honeycomb panel itself during removal of the potted insert.

There is therefore a need for an improved potted insert that would provide a more convenient and rapid way of adapting to different fastening requirements. Furthermore, such improved desired potted insert should be easily replaceable in case of damage or engineering changes.

SUMMARY

It is an object of the present disclosure to provide a two-part adjustable potted insert that overcomes or mitigates one or more disadvantages of known inserts or at least provides a useful alternative.

According to an embodiment, there is provided an adjustable potted insert to be received within a honeycomb panel for fastening a threaded fastener thereon, the honeycomb panel defining an insert hole, the adjustable potted insert comprising: an outer structural member to be received within the insert hole, the outer structural member comprising: an external main body defining an external surface configured to resist pull-out and torque-out to retain the outer structural member in the honeycomb panel when inserted in the insert hole; a threaded opening within the external main body, the threaded opening defining a bottom surface; and a locking recess formed within the bottom surface; an inner structural member in a releasable engagement with the outer structural member, the inner structure member comprising: an internal main body defining a threaded external surface configured to be in a threaded engagement with the threaded opening; a main threaded opening within the internal main body for receiving the threaded fastener therein; and a secondary threaded opening within the internal main body at a distance from the main threaded opening; and an elongated member in a releasable engagement with the inner structural member and the locking recess, the elongated member defining an elongated member threaded external surface configured to be in a threaded engagement with the secondary threaded opening.

According to another embodiment, there is provided the adjustable potted insert as described above, wherein the external main body defines an external main body first end and an external main body second end opposite the external main body first end, and further wherein the external main body comprises a flanged portion at the external main body first end.

According to a further embodiment, there is provided the adjustable potted insert as described above, wherein the external main body further comprises a potting recess formed within the flanged portion.

According to yet another embodiment, there is provided the adjustable potted insert as described above, wherein the potting recess comprises a plurality of spaced apart potting recesses formed within the flanged portion.

According to another embodiment, there is provided the adjustable potted insert as described above, wherein the external main body defines an external main body diameter and a flanged portion diameter being greater than the external main body diameter.

According to a further embodiment, there is provided the adjustable potted insert as described above, wherein the external main body comprises a plurality of spaced apart protrusions outwardly extending from the external surface, the plurality of spaced apart protrusions being configured to resist pull-out and torque-out to retain the outer structural member in the honeycomb panel when inserted in the insert hole.

According to yet another embodiment, there is provided the adjustable potted insert as described above, wherein the external main body defines a substantially cylindrical shape.

According to another embodiment, there is provided the adjustable potted insert as described above, wherein the threaded opening further defines: an outer end opposite the bottom surface; a threaded opening depth in between the outer end and the bottom surface; and a threaded internal surface defining a substantially cylindrical shape along part of the threaded opening depth configured to be in a threaded engagement with the threaded external surface of the internal main body.

According to a further embodiment, there is provided the adjustable potted insert as described above, wherein the locking recess comprises a plurality of regularly spaced apart locking recesses formed within the bottom surface, thereby providing a plurality of locking options for locking rotation of the inner structural member within the outer structural member about a central axis defined by the threaded opening.

According to yet another embodiment, there is provided the adjustable potted insert as described above, wherein each one of the plurality of regularly spaced apart locking recesses is at an equal distance from the central axis.

According to another embodiment, there is provided the adjustable potted insert as described above, wherein the internal main body defines an internal main body first end, an internal main body second end opposite the internal main body first end, and an internal main body length defined in between the internal main body first and second ends, the internal main body length being less than the threaded opening depth, thereby allowing sufficient space for the elongated member to releasably engage with the locking recess.

According to a further embodiment, there is provided the adjustable potted insert as described above, wherein the main threaded opening defines a main threaded internal surface configured to be in a threaded engagement with the threaded fastener inserted therein.

According to yet another embodiment, there is provided the adjustable potted insert as described above, wherein the secondary threaded opening defines a secondary threaded internal surface configured to be in a threaded engagement with the elongated member threaded external surface of the elongated member inserted therein.

According to another embodiment, there is provided the adjustable potted insert as described above, wherein the secondary threaded opening comprises a plurality of regularly spaced apart secondary threaded openings, each one of the plurality of regularly spaced apart secondary threaded openings being in alignment with a corresponding one of the plurality of regularly spaced apart locking recesses when the rotation of the inner structural member within the outer structural member is locked, thereby providing the plurality of locking options.

According to a further embodiment, there is provided the adjustable potted insert as described above, wherein the external main body defines an external main body substantially flat surface at the external main body first end, wherein the internal main body defines an internal main body substantially flat surface at the internal main body first end, and further wherein when the elongated member is in the releasable engagement with the inner structural member and the locking recess, the internal main body is in a locked position within the external main body and the external main body substantially flat surface is in alignment with the internal main body substantially flat surface.

According to yet another embodiment, there is provided the adjustable potted insert as described above, wherein the external main body defines an external main body substantially flat surface at the external main body first end, wherein the internal main body defines an internal main body substantially flat surface at the internal main body first end, and further wherein when the elongated member is in the releasable engagement with the inner structural member and the locking recess, the internal main body is in a locked position within the external main body and the external main body substantially flat surface is at a threaded distance from the internal main body substantially flat surface.

According to another embodiment, there is provided the adjustable potted insert as described above, wherein the inner structural member is raiseable and lowerable within the threaded opening of the outer structural member until the elongated member is engaged with the locking recess formed within the bottom surface of the threaded opening.

According to a further embodiment, there is provided the adjustable potted insert as described above, wherein the outer structural member is integrally formed.

According to yet another embodiment, there is provided an adjustable potted insert to be received within a honeycomb panel for fastening a threaded fastener thereon, the honeycomb panel defining an insert hole, the adjustable potted insert comprising: an outer structural member to be received within the insert hole, the outer structural member comprising: an external main body defining an external surface configured to resist pull-out and torque-out to retain the outer structural member in the honeycomb panel when inserted in the insert hole; an opening within the external main body; and a locking recess formed within the opening; an inner structural member in a releasable engagement with the outer structural member, the inner structure member comprising: an internal main body defining an external surface configured to be in engagement with the opening; a main threaded opening within the internal main body for receiving the threaded fastener therein; and a locking member in a releasable engagement with the locking recess; wherein at least part of the inner structural member may be locked within the opening found within the external main body according to a plurality of locking positions by engaging the locking member within the locking recess.

According to yet another embodiment, there is provided the adjustable potted insert as described above, wherein the opening found within the external main body is a threaded opening, and further wherein the external surface of the internal main body is a threaded external surface configured to be in a threaded engagement with the threaded opening.

BRIEF DESCRIPTION OF THE DRAWINGS

Further features and advantages of the present disclosure will become apparent from the following detailed description, taken in combination with the appended drawings, in which.

DETAILED DESCRIPTION

Figure 1A:
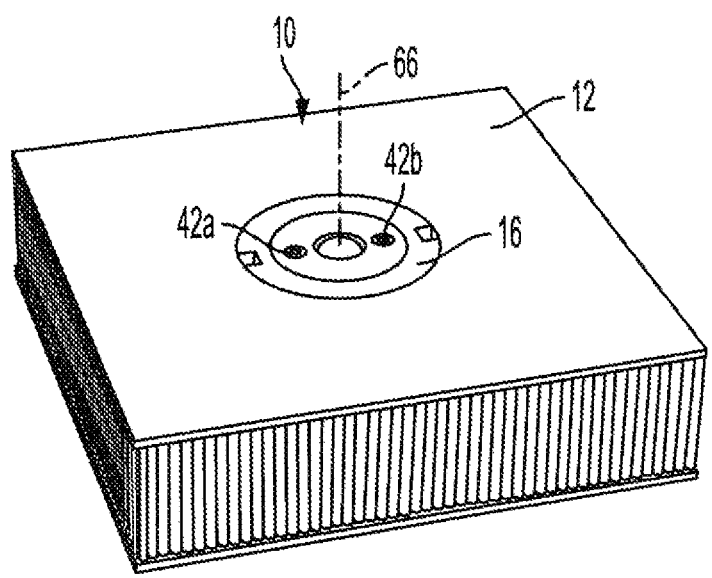
FIG. 1A is a top perspective view of an adjustable potted insert in accordance with an embodiment, the adjustable potted insert being received within an insert hole formed in a honeycomb panel for fastening a threaded fastener (not shown) thereon.
Figure 1B:
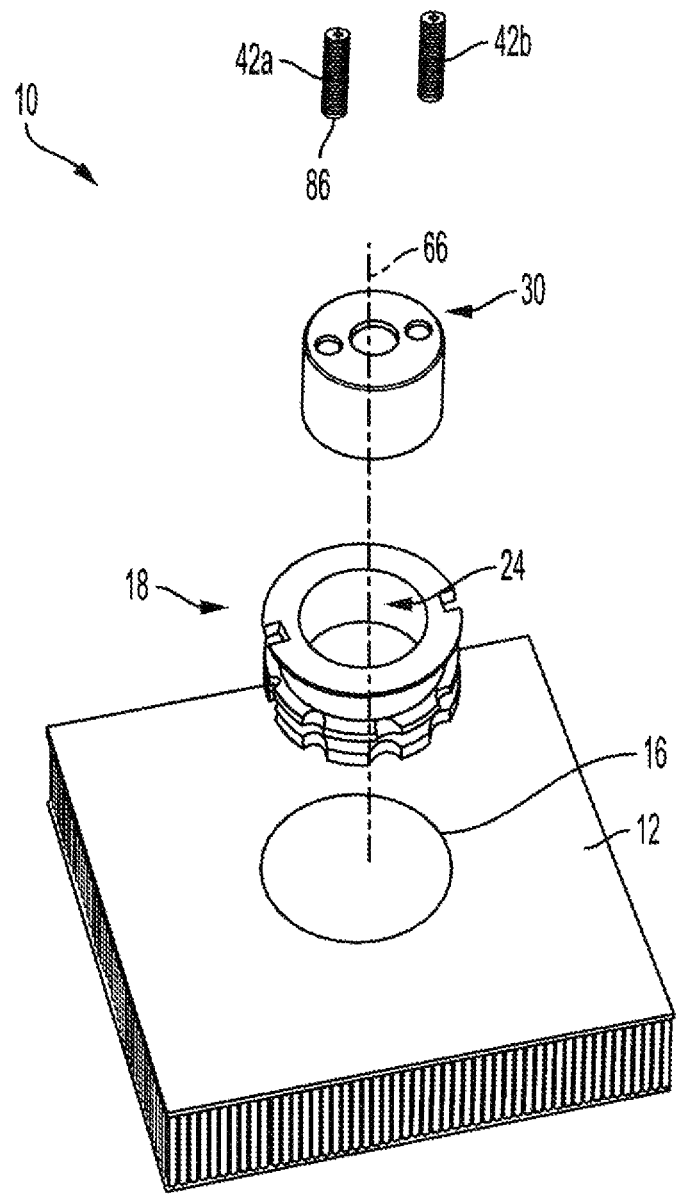
FIG. 1B is an exploded perspective view of the adjustable potted insert of FIG. 1A, the adjustable potted insert being configured to be received within the insert hole formed in the honeycomb panel for fastening the threaded fastener (not shown) thereon.

A two-part adjustable potted insert is described. Indeed, referring now to the drawings and more particularly to FIGS. 1A to 1E, 2A to 2F and 3A to 3F, there is shown an adjustable potted insert 10 (or adjustable blind threaded potted insert 10) to be received within a honeycomb panel or other composite panel 12 for the purpose of fastening a threaded fastener (not shown), a screw for example, thereon. As shown, honeycomb panel 12 defines an insert hole 16. Adjustable potted insert 10 comprises an outer structural member 18 which is configured to be received within insert hole 16 and anchored in place using an adhesive material, such as, without limitation, a two-part structural epoxy compound (not shown). Outer structural member 18 comprises an external main body 20, which defines an external surface 22, being configured to resist pull-out and torque-out to retain outer structural member 18 in honeycomb panel 12 when inserted in insert hole 16. Outer structural member 18 further comprises a threaded opening 24 centrally formed within external main body 20. Threaded opening 24 defines a bottom surface 26. Outer structural member 18 further comprises locking recesses 28a, 28b, 28c, 28d which are formed within bottom surface 26.

Figure 1C:
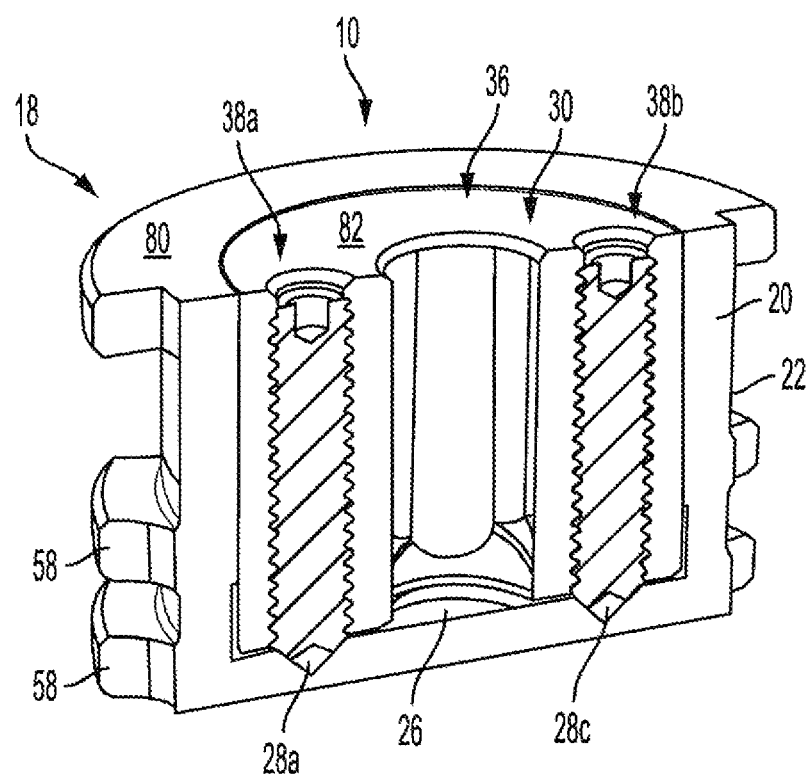
FIG. 1C is a cross-sectional view of the adjustable potted insert of FIG. 1A, the adjustable potted insert being configured to be received within the insert hole formed in the honeycomb panel for fastening the threaded fastener (not shown) thereon.
Figure 1D:
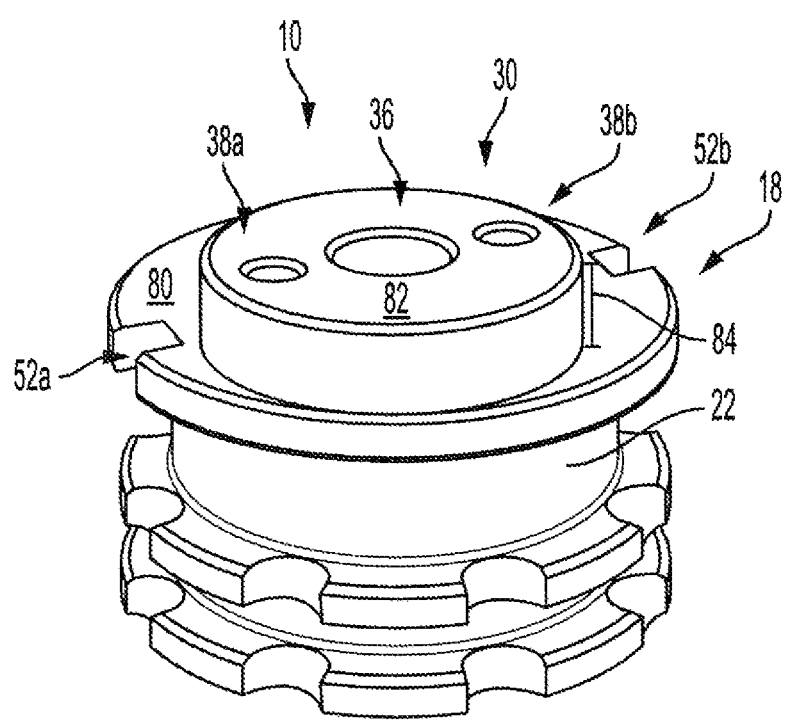
FIG. 1D is a top perspective view of the adjustable potted insert of FIG. 1A, where the internal main body substantially flat surface is being at a threaded distance from the external main body substantially flat surface.
Figure 1E:
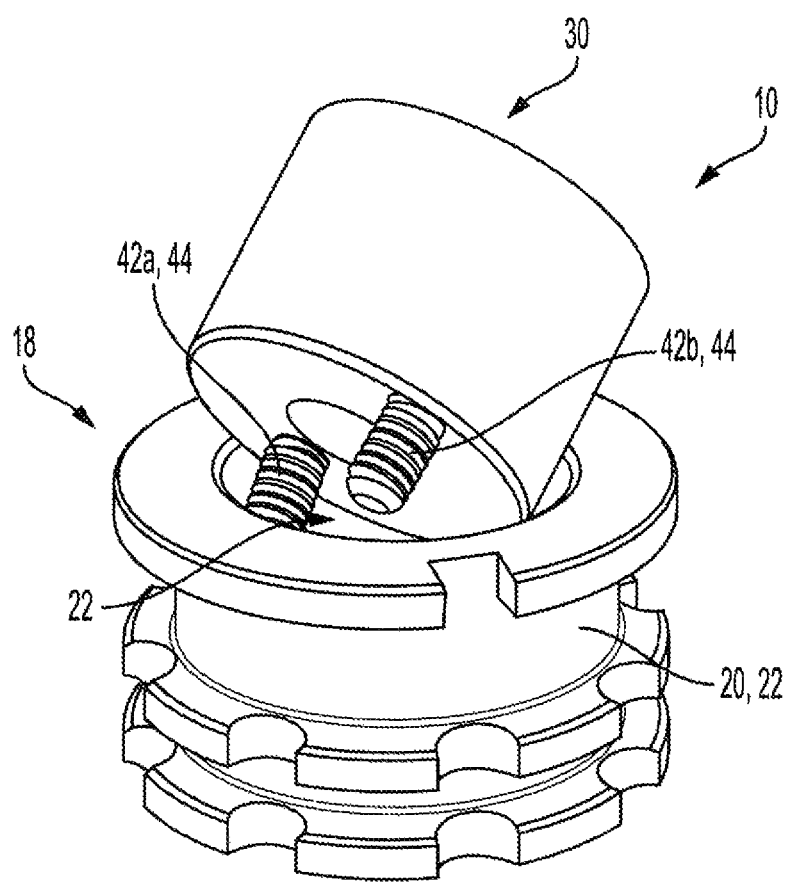
FIG. 1E is a top perspective view of the adjustable potted insert of FIG. 1A, where the inner structural member is to be introduced within the threaded opening defined by the external main body of the outer structural member.

Still referring to FIGS. 1A to 1E, 2A to 2F and 3A to 3F, there is shown that adjustable potted insert 10 further comprises an inner structural member 30 which is in a releasable engagement with outer structural member 18 (FIGS. 1A, 10 and 1D). Inner structural member 30 comprises an internal main body 32 which defines a threaded external surface 34 that is being configured to be in a threaded engagement with threaded opening 24. Inner structural member 30 further comprises a main threaded opening 36, centrally formed within internal main body 32. Main threaded opening 36 is adapted and configured to receive the threaded fastener (not shown) therein. Inner structural member 30 further comprises secondary threaded openings 38a, 38b formed within internal main body 32 at a distance 40 from main threaded opening 36. It is to be mentioned that one or more secondary threaded openings may be provided.

Still referring to FIGS. 1A to 1E, 2A to 2F and 3A to 3F, there are shown elongated members 42a, 42b that are configured to be in a releasable engagement with inner structural member 30 and further, with locking recesses 28a, 28b, 28c, 28d. Each one of elongated members 42a, 42b defines an elongated member threaded external surface 44, which is configured to be in a threaded engagement with secondary threaded openings 38a, 38b.

Referring now more particularly to FIGS. 2A to 2F, there is shown that external main body 20 of outer structural member 18 of adjustable potted insert 10 defines an external main body first end 46 and an external main body second end 48, which is found opposite external main body first end 46. As shown, external main body 20 further comprises a flanged portion 50 at external main body first end 46.

Still referring to FIGS. 2A to 2F, there is shown that external main body 20 further comprises potting recesses or slots 52a, 52b formed within flanged portion 50. It is to be mentioned that even if two potting recesses 52a, 52b are shown to be formed within flanged portion 50 of outer structural member 18, a person skilled in the art to which adjustable potted insert 10 pertains would understand that one or more potting recess or recesses may be formed within flanged portion 50. The potting recesses may be regularly or irregularly spaced along periphery of flanged portion 50 and may adopt any size, shape and/or configuration, as long as they accurately help securing outer structural member 18 to honeycomb panel 12 using the adhesive material, an epoxy material for example, as it will be described in more details below. Furthermore, as illustrated in FIGS. 2A to 2F, external main body 20 defines an external main body diameter 54 and a flanged portion diameter 56, the later being greater than external main body diameter 54.

External main body 20 further comprises a plurality of spaced apart protrusions 58 which outwardly extend from external surface 22. Plurality of spaced apart protrusions 58 is being configured to resist pull-out and torque-out to retain outer structural member 18 in honeycomb panel 12 when inserted in insert hole 16. It is to be mentioned that a person skilled in the art to which adjustable potted insert 10 pertains would understand that the set of potting recesses 52 may adopt any size, shape and/or configuration, as long as it accurately helps securing outer structural member 18 to honeycomb panel 12.

Therefore, once outer structural member 18 is inserted into insert hole 16 provided in honeycomb panel 12, the adhesive material may be injected via potting recesses 52a, 52b and is diverted by ribbings or spaced apart protrusions 58, which also act (together with adhesive material) as anchor points to secure outer structural member 18 to honeycomb panel 12. Pulling-out outer structural member 18 away from honeycomb panel 12 will be quite difficult once the adhesive material has been applied, which is why it is beneficial to provide an easily interchangeable inner structural member 30 which can be quickly disengaged from outer structural member 18.

Still referring to FIGS. 2A to 2F, there is shown that external main body 20 defines a substantially cylindrical shape and that threaded opening 24 further defines an outer end 60 opposite bottom surface 26. Threaded opening 24 further defines a threaded opening depth 62, defined in between outer end 60 and bottom surface 26. Threaded opening 24 also defines a threaded internal surface 64 which defines a substantially cylindrical shape along part of threaded opening depth 62. Threaded internal surface 64 is therefore configured to be in threaded engagement with threaded external surface 34 of internal main body 32.

Figure 2A:
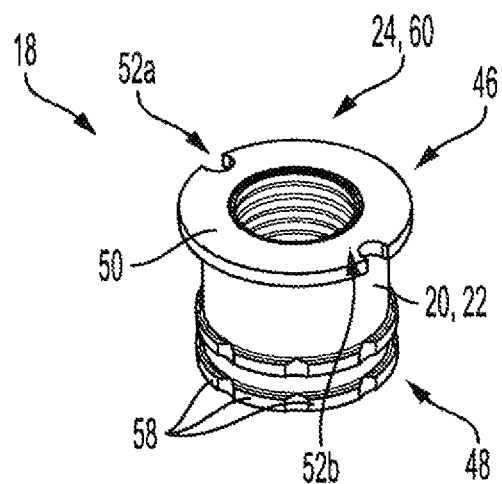
FIG. 2A is a top perspective view of an outer structural member of an adjustable potted insert in accordance with another embodiment.
Figure 2B:
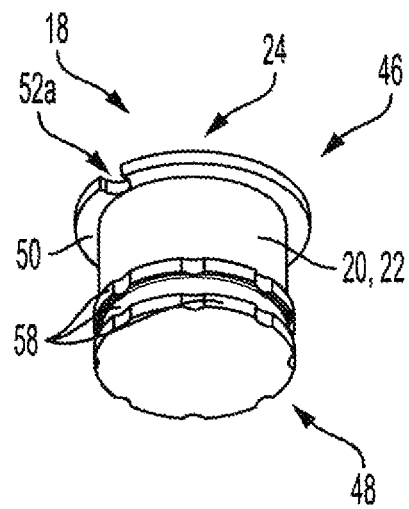
FIG. 2B is a bottom perspective view of the outer structural member of FIG. 2A.
Figure 2C:
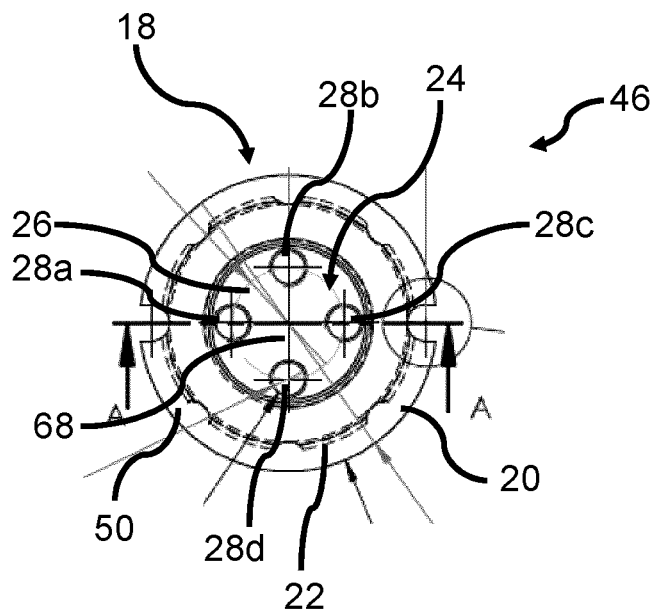
FIG. 2C is a top plan view of the outer structural member of FIG. 2A.
Figure 2D:
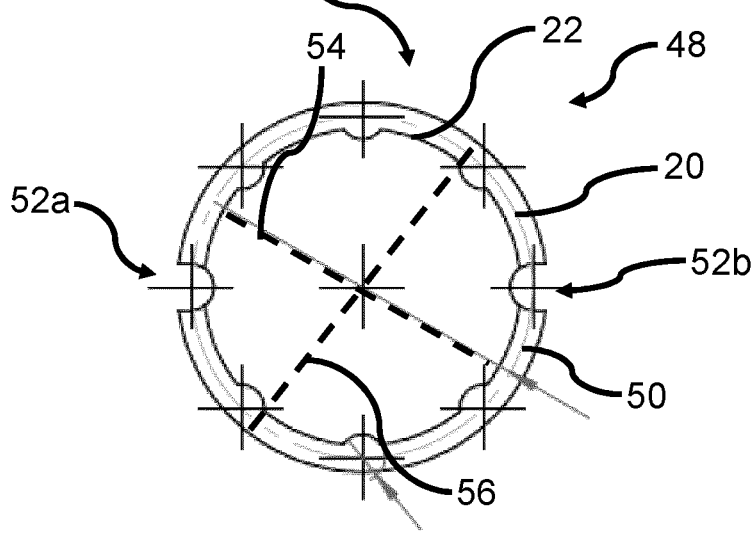
FIG. 2D is a bottom plan view of the outer structural member of FIG. 2A.
Figure 2E:
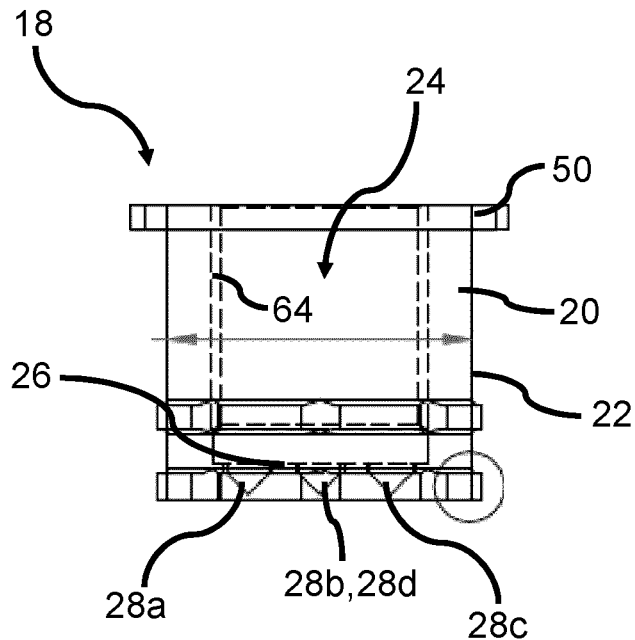
FIG. 2E is a side elevation view of the outer structural member of FIG. 2A.
Figure 2F:
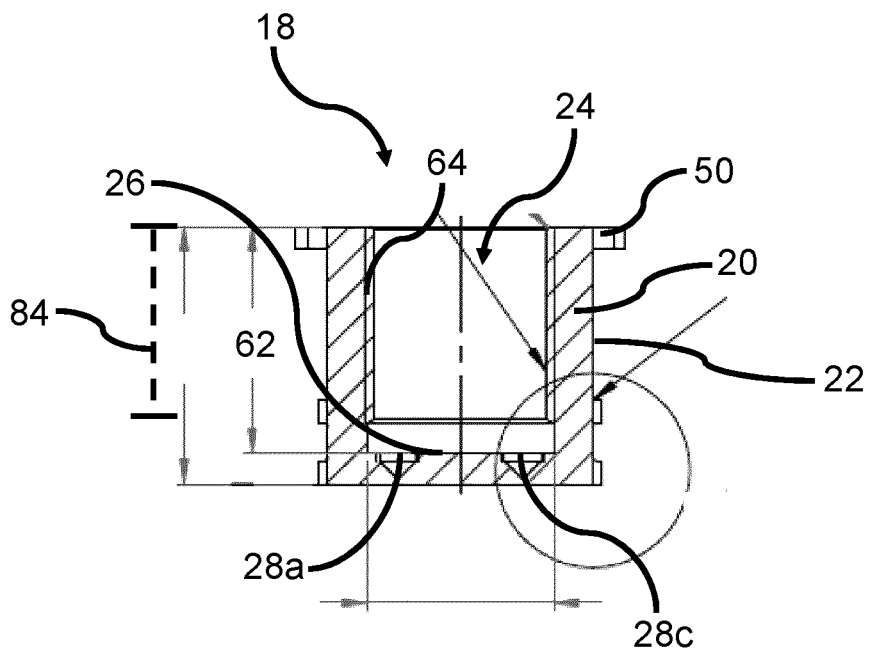
FIG. 2F is cross-sectional elevation view taken along line A-A of the outer structural member of FIG. 2C.

As best illustrated in FIGS. 2C and 2F, there is shown that the plurality locking recesses 28a, 28b, 28c, 28d that is formed within bottom surface 26 of threaded opening 24 are regularly spaced apart, thereby providing a plurality of locking options/configurations for locking rotation of inner structural member 30 within outer structural member 18 about a central axis 66 centrally defined by/within threaded opening 24, as it will be described in more details below. Indeed, each one of the plurality of regularly spaced apart locking recesses 28a, 28b, 28c, 28d is at an equal distance 68 from central axis 66.

Now referring to FIGS. 3A to 3F, there is shown that internal main body 32 of inner structural member 30 defines an internal main body first end 70, an internal main body second end 72, found opposite internal main body first end 70, and an internal main body length 74, defined in between internal main body first and second ends 70, 72. As shown, internal main body length 74 is being less than threaded opening depth 62, thereby allowing sufficient space for elongated members 42a, 42b to releasably engage with corresponding ones of the plurality of locking recesses 28a, 28b, 28c, 28d.

Still referring to FIGS. 3A to 3F, there is shown that main threaded opening 36 defines a main threaded internal surface 76, which is being configured to be in a threaded engagement with the threaded fastener (not shown) inserted therein.

On the other hand, each one of secondary threaded openings 38a, 38b defines a secondary threaded internal surface 78 which is configured to be in a threaded engagement with elongated member threaded external surface 44 of corresponding elongated members 42a, 42b inserted therein.

As shown, the plurality of regularly spaced apart secondary threaded openings 38a, 38b are regularly spaced apart and each one of the secondary threaded openings 38a, 38b is being in alignment with a corresponding one of spaced apart locking recesses 28a, 28b, 28c, 28d when the rotation of inner structural member 30 within outer structural member 18 is locked, thereby providing the plurality of locking options described above.

As best shown in FIGS. 1C and 1D, external main body 20 (or flanged portion 50) defines an external main body substantially flat surface 80 at external main body first end 46 and internal main body 32 also defines an internal main body substantially flat surface 82 at internal main body first end 70.

Thus, in accordance with a first scenario (FIG. 1C), when elongated members 42a, 42b are fully but releasable engaged with inner structural member 30 (or within secondary threaded openings 38a, 38b) and two of the four locking recesses 28a, 28b, 28c, 28d, internal main body 32 is in a locked position within external main body 20 (or within threaded opening 24) so that external main body substantially flat surface 80 is in alignment with internal main body substantially flat surface 82.

However, according to different other scenarios (FIG. 1D), when elongated members 42a, 42b are fully but releasably engaged with inner structural member 30 (or within secondary threaded openings 38a, 38b) and two of the four locking recesses 28a, 28b, 28c, 28d, internal main body 32 is in a locked position within external main body 20 (or within threaded opening 24) so that external main body substantially flat surface 80 is at a threaded distance 84 from internal main body substantially flat surface 82.

Therefore, according to the configuration of adjustable potted insert 10, inner structural member 30 is raiseable and lowerable within threaded opening 24 of outer structural member 18 until elongated members 42a, 42b are respectively engaged with two of the four locking recesses 28a, 28b, 28c, 28d formed within bottom surface 26 of threaded opening 24.

Even if outer structural member 18 is illustrated as being integrally formed (external main body 20, threaded opening 24, bottom surface 26, locking recesses 28a, 28b, 28c, 28d, flanged portion 50, potting recesses 52a, 52b and spaced apart protrusions 58 are integrally formed), it is to be mentioned that outer structural member 18 may take any shape, size and/or configuration, as long as it is being configured to resist pull-out and torque-out to retain outer structural member 18 in honeycomb panel 12 when inserted in insert hole 16; as long as threaded opening 24 provides releasable threaded engagement between inner structural member 30 and outer structural member 18, and further, as long as inner structural member 30 can rotate within threaded opening 24 about central axis 66 to be positioned at the required position (external and internal main body substantially flat surfaces 80, 82 being at same level or being separated by threaded distance 84) and locked by engaging elongated members 42a, 42b with two of the four locking recesses 28a, 28b, 28c, 28d.

Therefore, in order to provide installation of adjustable potted insert 10 within insert hole 16 of honeycomb panel 12 in a way to fasten a threaded fastener (not shown) thereon (or within main threaded opening 36 of inner structural member 30), outer structural member 18 is first introduced within insert hole 16 and anchored in place using an adhesive material, such as, without limitation, a two-part structural epoxy compound. Indeed, once outer structural member 18 is inserted into insert hole 16 provided in honeycomb panel 12, the adhesive material may be injected via potting recesses 52a, 52b and is diverted by ribbings or spaced apart protrusions 58, which also act (together with adhesive material) as anchor points to secure outer structural member 18 to honeycomb panel 12. Because of its configuration (presence of potting recesses 52a, 52b found on flanged portion 50 and spaced apart protrusions 58 outwardly extending from external surface 22) and once the epoxy material as solidified, outer structural member 18 will resist pull-out and torque-out and will be retained in honeycomb panel 12. Inner structural member 30 was previously engaged with outer structural member 18 as previously inserted within threaded opening 24 or may afterwards be engaged with outer structural member 18 by introducing it within threaded opening 24 and further by allowing its rotation relatively to central axis 66.

Rotation of inner structural member 30 about central axis 66 may provide internal main body substantially flat surface 82 to be leveled with external main body substantially flat surface 80 or a threaded distance 84 may be provide between external and internal main body substantially flat surfaces 80, 82, providing a plurality of different configurations to adjustable potted insert 10 such as to best suit the fastening needs to honeycomb panel 12 via adjustable potted insert 10 and the threaded fastener. Once threaded distance 84 (which may be 0, but if otherwise, secondary threaded openings 38a, 38b need to be aligned with at least two out of the four locking recesses 28a, 28b, 28c, 28d) is reached, elongated members 42a, 42b may be inserted within corresponding secondary threaded openings 38a, 38b so that a threaded engagement between an elongated member and its corresponding secondary threaded opening is provided along full length of secondary threaded opening. Because length of an elongated member is slightly greater than the length of its corresponding secondary threaded opening, distal end 86 of an elongated member will reach and engage within a corresponding locking recess from the plurality of locking recesses 28a, 28b, 28c, 28d. According to the configuration and/or positioning of locking recesses 28a, 28b, 28c, 28d formed within bottom surface 26 of threaded opening 24, and secondary threaded openings 38a, 38b, every 0.25 rotation of inner structural member 30 about central axis 66 and relatively to outer structural member 18 will allow engagement/locking of distal ends 86 of elongated members 42a, 42b with two opposed ones of the four locking recesses 28a, 28b, 28c, 28d formed within bottom surface 26 (and therefore, locking of inner structural member 30 relatively to outer structural member 18).

In other words, because it is often required that adjustable potted insert 10 be flush with the surface of honeycomb panel 12, it is possible to do so by providing external and internal main body substantially flat surfaces 80, 82 to be at the same level (in the same plane). However, when an operator requires internal main body substantially flat surface 82 to either protrude from or be recessed within threaded opening 24 of outer structural member 18, he may raise or lower inner structural member 30 relatively to external main body substantially flat surface 80 of outer structural member 18 by first loosening elongated members or screws 42a, 42b and by providing rotation of inner structural member in either a clockwise or a counterclockwise direction about central axis 66 to either raise it or lower it with respect to outer structural member 18. Once a desired threaded height or distance 84 is achieved, the operator may simply tighten back elongated members or screws 42a, 42b within secondary threaded openings 38a, 38b so that they engage with two out of four of locking recesses 28a, 28b, 28c, 28d, thereby locking inner structural member 30 into position and relatively to outer structural member 18.

A whole fastening kit may therefore include at least one outer structural member 18 and a plurality of different inner structural members 30, where each one of the inner structural members 30 would comprises a different main threaded opening 36, such as to be able to receive a plurality of different threaded fasteners of different shapes, sizes, types, and/or configuration. The plurality of inner structural members 30 are therefore interchangeable, so that each one of them is adapted to engage within threaded opening 24 of outer structural member 18, while providing different sizes, shapes, types, and/or configurations or main threaded openings 36.

Figure 3A:
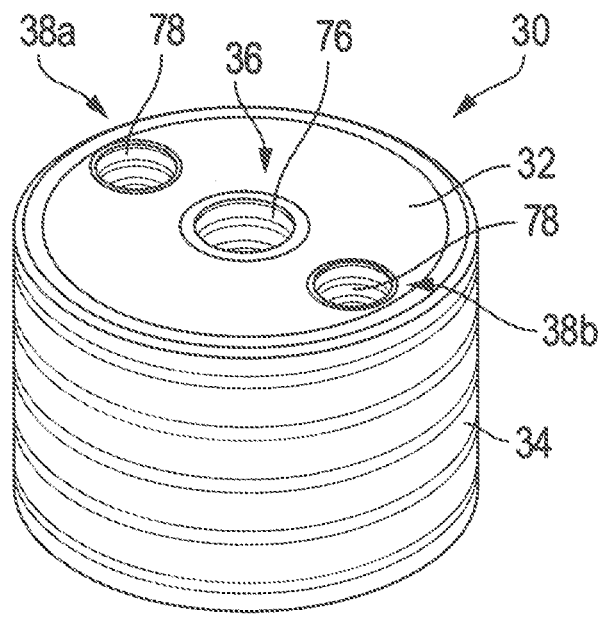
FIG. 3A is a top perspective view of an inner structural member of the adjustable potted insert mentioned above.
Figure 3B:
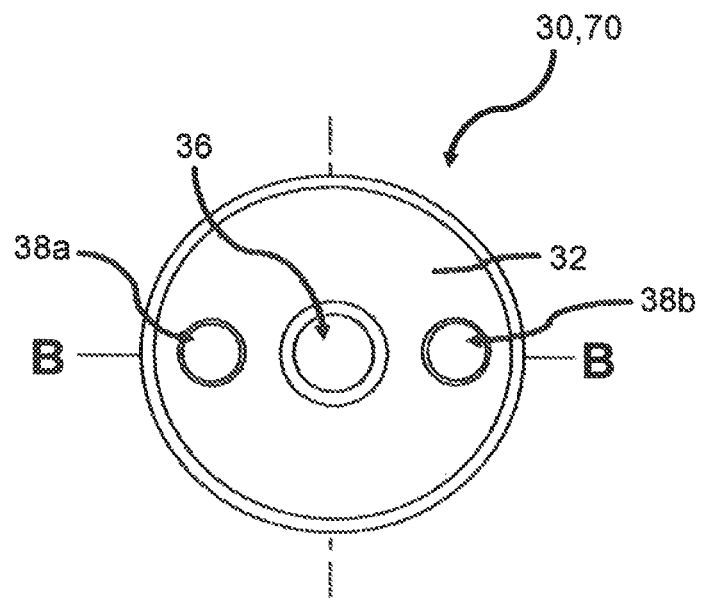
FIG. 3B is a top plan view of the inner structural member of FIG. 3A.
Figure 3C:
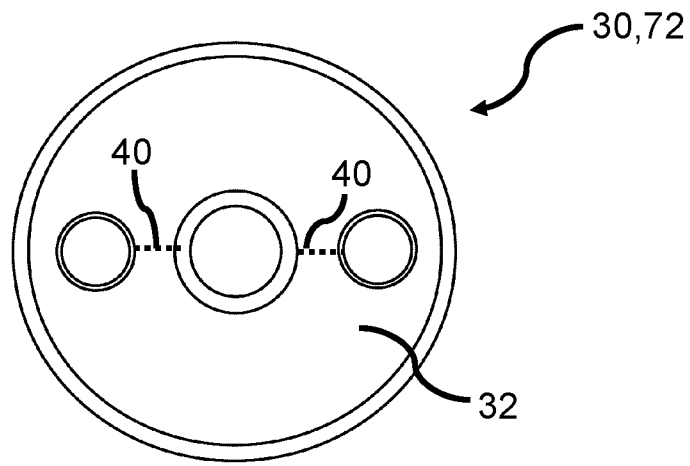
FIG. 3C is a bottom plan view of the inner structural member of FIG. 3A.
Figure 3D:
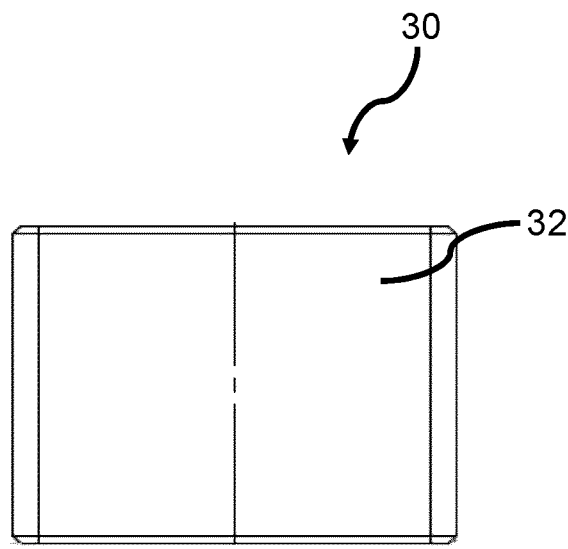
FIG. 3D is a side elevation view of the inner structural member of FIG. 3A.
Figure 3E:
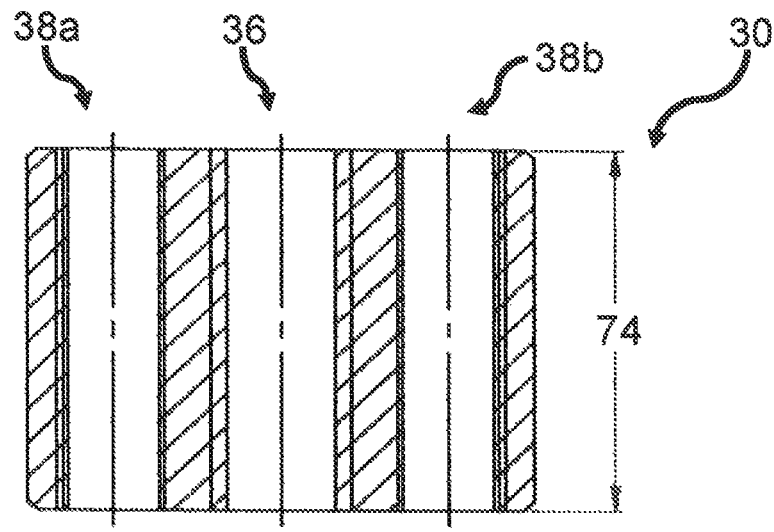
FIG. 3E is a cross-sectional side elevation view taken along line B-B of the inner structural member of FIG. 3B.
Figure 3F:
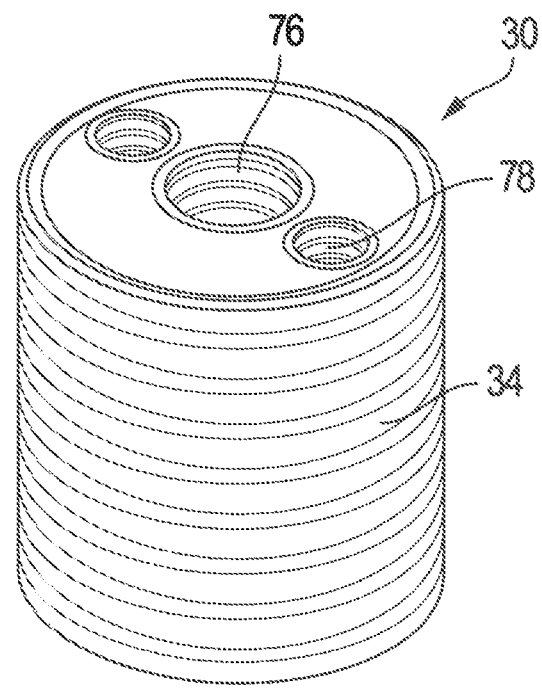
FIG. 3F is a top perspective view of an inner structural member of the adjustable potted insert mentioned above in accordance with a further embodiment.

This would allow an operator to quickly and easily adapt adjustable potted insert 10 by providing outer structural member 18 to engage a different inner structural member 30, such as to reach a given application's specifications and requirements (new screws are required for instance). Furthermore, if an inner structural member 30 is damaged (main threaded opening 36 or secondary threaded openings 38a, 38b are stripped for example), the operator would be able to easily disengage the damaged inner structural member 30 of threaded opening 24 of outer structural member 18 and replace it with a new inner structural member 30 (FIGS. 3A and 3F).

It is to be mentioned that adjustable potted insert 10 may take any shape, size and/or configuration so it can be strongly secured/fixed to different honeycomb panels 12 of varying thicknesses. Therefore, a person skilled in the art to which adjustable potted insert 10 pertains would understand that outer and inner structural members 18, 30 may take any shape, size and/or configuration, including external main body 20 and internal main body 32 of varying lengths and diameters. For example, a particular outer structural member 18 may have a length of 0.75 inches, while another may have a length of 0.5 inches (FIGS. 3A and 3F). Furthermore, a person skilled in the art to which adjustable potted insert 10 pertains would understand that threaded external surface 34 of inner structural member 30 may define varying threading configurations and pitches based on the desired application to be performed. For example, threaded external surface 34 of inner structural member 30 may be threaded based on 10-32 UNF, 8-32 UNC or 6-32 UNC specifications.

Finally, it is to be mentioned that, even if engagement between inner structural member 30 and outer structural member 18 is described above as being possible via threaded engagement between threaded external surface 34 of inner structural member 30 and threaded opening 24 defined within external main body 20 of outer structural member 18, a person skilled in the art to which adjustable potted insert 10 pertains would understand that other mechanisms, different than providing threaded surfaces that interface together, may be provided to allow inner structural member 30 to lower and raise within threaded opening 24 and relatively to outer structural member 18. Indeed, according to a different embodiment, inner structural member 30 may displace up and down in a sliding movement that would be locked at different levels within opening 24 (which is not threaded in this scenario) so that it provides the operator to position internal main body substantially flat surface 82 at a plurality of threaded distances 84 relatively to external main body substantially flat surface 80.

Similarly, it is to be mentioned that, even if engagement between elongated members 42a, 42b and secondary threaded openings 38a, 38b is described above as being a threaded engagement between elongated member threaded external surface 44 and secondary threaded internal surface 78 defined within internal main body 32, a person skilled in the art to which adjustable potted insert 10 pertains would understand that other mechanisms, different than providing threaded surfaces that interface together, may be provided to elongated members 42a, 42b to be lowered and raised within secondary threaded openings 38a, 38b and relatively to inner structural member 30 in a way to engage their distal end 86 within two opposed ones of the four locking recesses 28a, 28b, 28c, 28d such as to lock in place at a desired height inner structural member 30 relatively to outer structural member 18.

Although the present invention has been described hereinabove by way of specific embodiments thereof, it can be modified, without departing from the spirit and nature of the subject invention defined in the appended claims.

The invention claimed is:

1. A system, comprising:
  a honeycomb panel having an insert hole defined therein;
  an adjustable potted insert configured to be received within the insert hole of the honeycomb panel for fastening a threaded fastener thereon, the adjustable potted insert comprising:
    an outer structural member configured to be received within the insert hole, the outer structural member comprising:
      an external main body defining an external surface configured to resist pull-out and torque-out to retain the outer structural member in the honeycomb panel when inserted in the insert hole;
      a threaded opening within the external main body, the threaded opening defining a bottom surface; and
      a locking recess formed within the bottom surface;
    an inner structural member in a releasable engagement with the outer structural member, the inner structure member comprising:
      an internal main body defining a threaded external surface configured to be in a threaded engagement with the threaded opening of the outer structural member;
      a main threaded opening within the internal main body configured to receive the threaded fastener therein; and
      a secondary threaded opening within the internal main body at a distance from the main threaded opening; and
    an elongated member in a releasable engagement with the inner structural member and the locking recess, the elongated member defining an elongated member threaded external surface configured to be in a threaded engagement with the secondary threaded opening.

2. The system of claim 1, wherein the external main body comprises a plurality of spaced apart protrusions outwardly extending from the external surface, the plurality of spaced apart protrusions being configured to resist pull-out and torque-out to retain the outer structural member in the honeycomb panel when inserted in the insert hole.

3. The system of claim 1, wherein the external main body defines a substantially cylindrical shape.

4. The system of claim 1, wherein the main threaded opening defines a main threaded internal surface configured to be in a threaded engagement with the threaded fastener inserted therein.

5. The system of claim 1, wherein the secondary threaded opening defines a secondary threaded internal surface configured to be in a threaded engagement with the elongated member threaded external surface of the elongated member inserted therein.

6. The system of claim 1, wherein the external main body defines an external main body substantially flat surface at the external main body first end, wherein the internal main body defines an internal main body substantially flat surface at the internal main body first end, and further wherein when the elongated member is in the releasable engagement with the inner structural member and the locking recess, the internal main body is in a locked position within the external maul body and the external main body substantially flat surface is in alignment with the internal main body substantially flat surface.

7. The system of claim 1, wherein the external main body defines an external main body substantially flat surface at the external main body first end, wherein the internal main body defines an internal main body substantially flat surface at the internal main body first end, and further wherein when the elongated member is in the releasable engagement with the inner structural member and the locking recess, the internal main body is in a locked position within the external main body and the external main body substantially flat surface is at a threaded distance from the internal main body substantially flat surface.

8. The system claim 1, wherein the inner structural member is raiseable and lowerable within the threaded opening of the outer structural member until the elongated member is engaged with the locking recess formed within the bottom surface of the threaded opening.

9. The system of claim 1, wherein the outer structural member is integrally formed.

10. The system of claim 1 wherein at least part of the inner structural member is lockable within the threaded opening within the external main body to achieve a plurality of locking positions by engaging the elongated member within the locking recess.

11. The system of claim 1, wherein the threaded opening further defines:
an outer end opposite the bottom surface;
a threaded opening depth in between the outer end and the bottom surface; and a threaded internal surface defining a substantially cylindrical shape along part of the threaded opening depth configured to be in a threaded engagement with the threaded external surface of the internal main body.

12. The system of claim 11, wherein the internal main body defines an internal main body first end, an internal main body second end opposite the internal main body first end, and an internal main body length defined in between the internal main body first and second ends, the internal main body length being less than the threaded opening depth, thereby allowing sufficient space for the elongated member to releasably engage with the locking recess.

13. The system of claim 1, wherein the locking recess comprises a plurality of regularly spaced apart locking recesses formed within the bottom surface, thereby providing a plurality of locking options for locking rotation of the inner structural member within the outer structural member about a central axis defined by the threaded opening.

14. The system of claim 13, wherein each one of the plurality of regularly spaced apart locking recesses is at an equal distance from the central axis.

15. The system of claim 13, wherein the secondary threaded opening comprises a plurality of regularly spaced apart secondary threaded openings, each one of the plurality of regularly spaced apart secondary threaded openings being in alignment with a corresponding one of the plurality of regularly spaced apart locking recesses when the rotation of the inner structural member within the outer structural member is locked, thereby providing the plurality of locking options.

16. The system of claim 1, wherein the external main body defines an external main body first end and an external main body second end opposite the external main body first end, and further wherein the external main body comprises a flanged portion at the external main body first end.

17. The system of claim 16, wherein the external main body defines an external main body diameter and a flanged portion diameter being greater than the external main body diameter.

18. The system of claim 16, wherein the external main body further comprises a potting recess formed within the flanged portion.

19. The system of claim 18, wherein the potting recess comprises a plurality of spaced apart potting recesses formed within the flanged portion.

* * * * *